United States Patent [19]

Ollivier et al.

[11] Patent Number: 4,678,385
[45] Date of Patent: Jul. 7, 1987

[54] FIXING PEG

[75] Inventors: Jean Ollivier, Valence; Roland Almeras, Tournon, both of France

[73] Assignee: Illinois Tool Works Inc., Chicago, Ill.

[21] Appl. No.: 863,067

[22] Filed: May 14, 1986

[51] Int. Cl.⁴ .............................................. F16B 15/06
[52] U.S. Cl. .................. 411/456; 411/479; 411/510
[58] Field of Search ................... 411/477–480, 411/450, 456, 460, 447, 448, 510, 61; 52/155, 712, 787

[56] References Cited

U.S. PATENT DOCUMENTS

| 875,779 | 1/1908 | Clover | 411/456 |
| 3,366,405 | 1/1968 | Sevrence | 411/510 |
| 3,983,779 | 10/1976 | Dimas | 411/447 |
| 4,284,379 | 8/1981 | Chaiko | 411/61 |
| 4,354,782 | 10/1982 | Newport | 411/479 |
| 4,502,818 | 3/1985 | Elders | 411/61 |

FOREIGN PATENT DOCUMENTS

| 19453 | of 1903 | United Kingdom | 411/61 |
| 652978 | 5/1951 | United Kingdom | 411/61 |

Primary Examiner—Gary L. Smith
Assistant Examiner—Neill Wilson
Attorney, Agent, or Firm—David I. Roche; Thomas W. Buckman

[57] ABSTRACT

A fixing peg is provided comprising a body and a bearing washer for fixing an insulating panel. The body is tubular, with a support portion and an anchorage portion and is split over the whole of its length. In the anchorage portion two abutment tongues project from the lips of the slit, against which tongues the lips come into abutment during anchorage for increasing the anchorage pressure.

8 Claims, 5 Drawing Figures

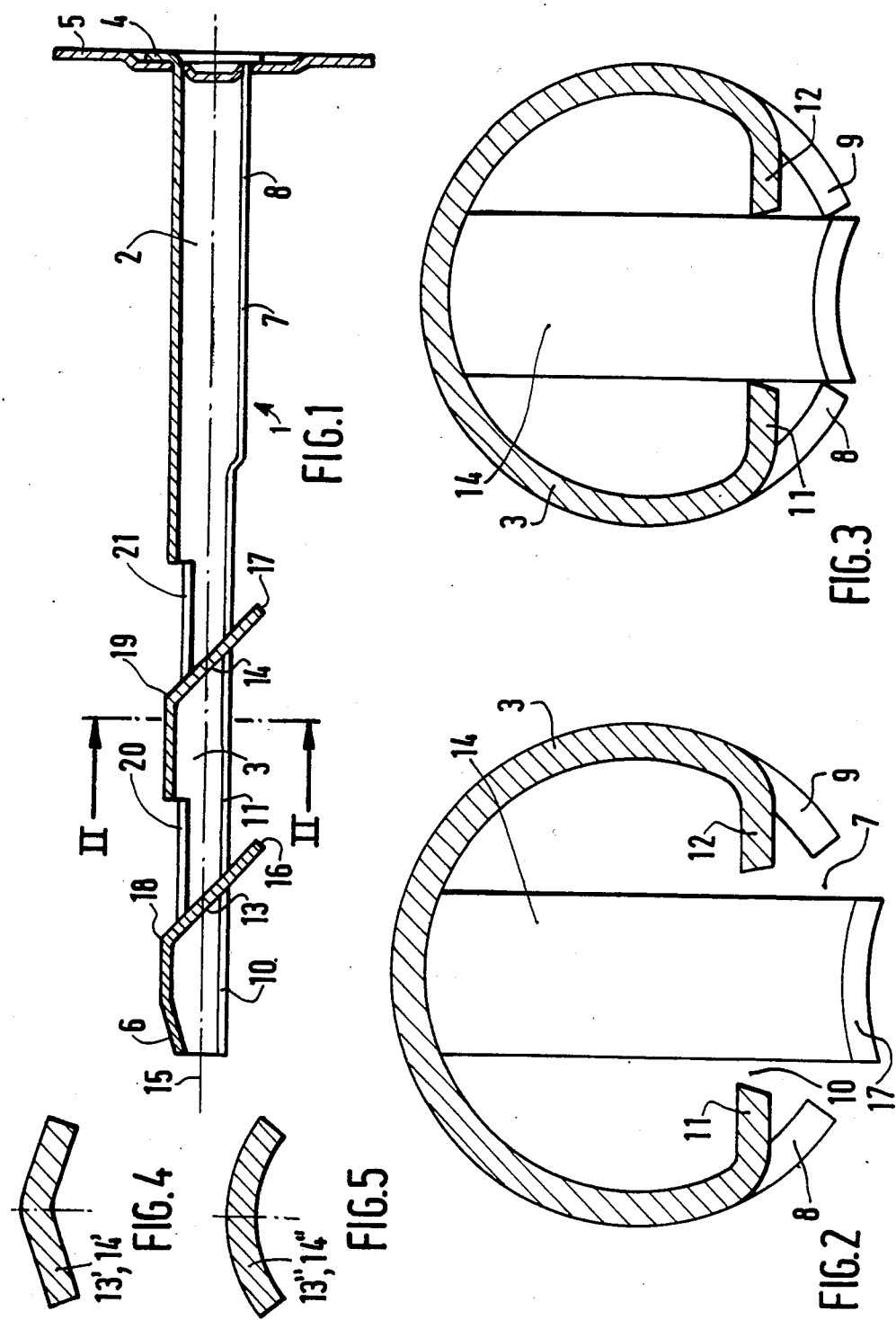

FIXING PEG

BACKGROUND OF THE INVENTION

1. Field of the Invention

The present invention relates to a peg, more especially for fixing insulating panels, comprising a resilient generally tubular shaped body of a length considerably greater than the diameter, having a longitudinal slit and, at one of the ends of the body and integral therewith, bearing means, for example crimped.

Such a peg is used for fixing for example an insulating panel to a receiving material.

2. Description of the Prior Art

After boring in the receiving material a hole of a diameter slightly less than that of the body of the peg and through the insulating panel, the peg is introduced into the hole by hammering by its end opposite the bearing means until said means come into abutment against the panel. During penetration of the body into the hole, the lips of the slit are constricted, which places the resilient body under tension and confers on the peg its resistance to removal by direct traction.

Such pegs are already known. They are made from metal sheet, rolled to a free outer diameter substantially greater than the nominal bore diameters.

It may be a thick metal sheet which, once rolled, is subjected to heat treatment, which excludes some materials.

It may also be a finer metal sheet, then made from galvanized or stainless steel. These fine metal sheet peg, available on the market, have a longitudinal slit formed between two lips bent back inwardly for better accomodating the possible variation of the bore diameters.

But the performances of these two types of pegs leave much to be desired.

The present invention provides then a peg of the above mentioned type whose quality to price ratio is satisfactory.

SUMMARY OF THE INVENTION

To this end, the present invention provides a fixing peg comprising a generally tubular shaped resilient body having a longitudinal slit and, at one of the ends of the body and integral therewith, bearing means, the width of the slit, over at least a portion of the length of the body extending from the other one of its ends, being determined so that at least a tongue, integral with the body, extends in this slit portion.

During introduction of the peg into a bore, the tongue opposes constriction of the lips of the slit portion which come into abutment above, which increases the contact pressure of the peg body against the wall of the material, and so its resistance to tearing away. In general, the tongue forms a means serving as abutment for the lips of the slit.

Furthermore, the tongue may project from the envelope surface of the body and thus provide, during introduction, a non return function.

In the preferred embodiment of the pin of the invention, several lip abutment tongues are provided formed by punching the part of the body substantially diametrically opposite the slit, the tongues being slanted with respect to the axis of the peg with their free ends turned towards the bearing means.

Advantageously, the abutment tongues are formed so as to be deformable transversely during penetration of the peg and thus to be better able to accomodate possible bore diameter variations.

BRIEF DESCRIPTION OF THE DRAWINGS

The invention will be better understood from the following description of a preferred embodiment of the pin of the invention, with reference to the accompanying drawings in which:

FIG. 1 shows an axial sectional view of the peg of the invention;

FIG. 2 shows a cross sectional view of the peg of FIG. 1 through line II—II, in the free state and on a larger scale;

FIG. 3 shows a view similar to that of FIG. 2 but after positioning of the peg;

FIG. 4 shows a cross sectional view of an abutment tongue, and

FIG. 5 shows a cross sectional view of a variant of an abutment tongue.

DESCRIPTION OF THE PREFERRED EMBODIMENTS

The peg shown in the drawings comprises a body 1, of a general tubular shape, whose length is considerably greater than the diameter, with a support portion 2 and an anchorage portion 3.

At the free end of the support portion 2, the body is bent back outwardly in the form of a collar 4 for securing, for example by crimping, a bearing washer 5.

Thus, after boring an anchorage hole in a receiving material and a passage orifice in a panel, for example an insulating panel, to be fixed to the receiving material and of a thickness at most equal to the length of the support portion 2 of the peg, and after placing the panel against the support material the peg is fitted through the passage orifice in the panel into the anchorage hole which is of a diameter slightly less than that of the peg. Once anchored, the insulating element is applied against the material by the bearing washer 5.

At the free end 6 of the anchorage portion 3, the body has the form of a cone so as to facilitate introduction thereof into the bore.

The body 1 of the peg has been made from galvanized or stainless steel sheet, at least slightly resilient then rolled. Developed, this starting metal sheet had a surface shaped so that, once rolled, the body has a longitudinal slit extending over the whole of its length from the cone 6 as far as the collar 4. Here, along the support portion 2, the width of the portion of the slit 7, between two lips 8, 9, is substantially equal to that of the slit portion 10 of the anchorage portion 3 between two lips 11, 12. The lips 11, 12 are bent back inwardly in a plane perpendicular to the plane of symmetry of the peg.

Still before being rolled, the starting metal sheet had been punched so as to form, once rolled, from parts 18, 19 of the body diametrically opposite the median part of the slit 10, two abutment tongues 13, 14 slanted inwardly through a certain angle with respect to the axis 15 of the peg, their free ends 16, 17 being turned towards the bearing washer 5 and so as to form two oblong openings 20, 21.

In the free or rest state, i.e. before introduction of the peg into the anchorage hole, the slant angle of tongues 13, 14 is such that they project slightly from the fictive envelope surface of the body, so also from the slit portions 7 and 10.

During introduction, tongues 13, 14 rub against the wall of the anchorage hole, while being bent slightly back towards the axis of the peg, and thus play a non return role.

When the peg is driven into the bore, over the length of the anchorage portion 3, the lips 11 and 12 are constricted and forced together until they come into abutment against the tongues 13, 14, before deforming them transversely thus preventing any excessive constriction of the lips so as to maintain the appropriate contact pressure against the wall of the anchorage hole. After positioning, the slit portion 7 is slightly closed.

The developed surface of the starting metal sheet of the body of the peg is calculated so that, once anchored, the lips 11, 12 not only come into abutment against the free ends of the tongues but may also deform them.

For better accomodating the variations in diameter of the anchorage holes, the tongues have, at the outset, a section, either curved as tongues 13", 14" of FIG. 5 or in the form of a dihedron, such as tongues 13', 14' of FIG. 4, with their concavity turned either towards the slit portion 10, or oppositely, so as to better undergo the transverse deformation.

Abutment tongues formed by punching the starting metal sheet have been described. It is clear that the invention is not limited to such an embodiment. The tongues could just as well be added to the inner surface of the body, for example by welding.

Similarly, a peg has been described with an anchorage slit portion having bent back lips. It is clear that this is not a limitative characteristic of the invention, no more than the shape or conformation of the tongues and of the slits which, in the above described representation, have parallel abutment edges or lips.

Furthermore, along the lips of the slit portions setback portions could be provided playing in their turn an abutment role, but in the axial direction of the peg, for the tongues and thus improving the above mentioned non return function.

Finally, the peg of the invention could also be formed with other techniques, such for example by molding or by injection.

What is claimed is:

1. A fixing peg comprising a generally tubular shaped resilient body having a longitudinal slit and integral bearing means at one end of the body, said slit extending over a substantial portion of the length of said body, edges of said body adjacent said slit defining lips, abutment means for limiting constrictive movement of said lips, said abutment means including at least one tongue struck from a portion of said body opposite said slit and extending into said slit.

2. The peg as claimed in claim 1 wherein said tongue is slanted with respect to the axis of the peg.

3. The peg as claimed in claim 1, wherein said tongue is shaped so as to be able to be deformed transverselly.

4. A fixing peg comprising a generally tubular shaped resilient body having a longitudinal slit and bearing means at one end of said body, said slit extending over a substantial portion of the length of said body, a least one tongue struck from a portion of said body opposite said slit and extending across the axis of said body and through said slit, whereby said tongue can engage the walls of a bore into which said peg is inserted.

5. A fixing peg as claimed in claim 4 wherein said body is made from a single piece of sheet metal.

6. A fixing peg as claim 4 wherein edges of said slit form lips which engage said tongue.

7. A fixing peg as claimed in claim 4 wherein said lips are substantially parallel with one another such that when the lips engage said tongue said lips are generally perpendicular to said tongue.

8. A peg as claimed in claim 4 wherein said tongue has a non-planar cross section whereby said tongue has transverse resilience when compressed by said lips.

* * * * *